United States Patent Office 3,631,011
Patented Dec. 28, 1971

3,631,011
METHOD FOR POLYMERIZING ETHYLENE BY USE OF NOVEL CATALYST SYSTEM
Kenichi Maemoto, Takatsuki-shi, Takezo Sano, Ibaragi-shi, and Katsuji Ueno, Hirakata-shi, Japan, assignors to Sumitomo Chemical Company, Ltd., Osaka, Japan
No Drawing. Filed Dec. 23, 1968, Ser. No. 786,378
Claims priority, application Japan, Dec. 28, 1967, 42/84,962
Int. Cl. C08d 3/02; C08f 15/04
U.S. Cl. 260—85.3
4 Claims

ABSTRACT OF THE DISCLOSURE

A process for the homopolymerization of ethylene and copolymerization of ethylene with olefins or diolefins using a catalyst composed of (1) a reaction product of an orthovanadate compound with a phosphoric acid or its derivative, and (2) an organo-aluminum compound having the formula, $$R_nAlX_{3-n}$$

wherein R is a hydrocarbon group having from 1 to 8 carbon atoms; X is a hydrogen or halogen atom or an alkoxy group; and $n$ is a positive number not more than 3.

---

Solid high polymers of ethylene have excellent physical and chemical properties, and hence have widely been utilized and are valuable in practical use when processed into molded articles, films, sheets and fibers. Further, copolymers of ethylene with other olefins such as propylene have been highly evaluated as elastomers.

As methods for producing high polymers of ethylene, there have heretofore been known a high pressure polymerization process using a radical initiator, a low pressure polymerization process using a catalyst comprising a reaction product of a transition metal halide and an organometallic compound, and a medium pressure polymerization process using as the main catalyst component a transition metal oxide supported on a carrier. These processes have excellent characteristics, respectively. For example, according to the high pressure polymerization process, the resulting polyethylene is rich in branches and low in density and softness. In accordance with the low pressure polymerization process, which is famous as the Ziegler process, the polymerization reaction can be effected under a low pressure in the vicinity of normal pressure, and the resulting polyethylene is poorer in branch and higher in density and rigidity. Further, according to the medium pressure polymerization process, which was developed by Phillips Petroleum Co. and Standard Oil Co., respectively, the catalyst has a long life and less variation in activity during polymerization, and the resulting polyethylene has the most straight chain and the highest density. On the other hand, these processes suffer from more or less drawbacks. For example, in the high pressure polymerization process, the polymerization reaction is effected under a high pressure more than 1000 atm., with the result that the reaction apparatus is necessarily required to be highly pressure-resistant and a danger accompanies the process. Further, the resulting polyethylene is low in density and is not suitable for uses where rigidity and mechanical strength are required. In the low pressure polymerization process, a catalyst prepared by mixing titanium tetrachloride with an alkylaluminum compound is deemed to be most effective. It is said, however, that not only the catalyst is markedly variable in activity depending on the mixing conditions and mixing procedures of the catalyst components but the catalyst activity also greatly varies during the reaction, and the catalyst life is relatively short. On the other hand, typical catalysts employed in the medium pressure polymerization process are a molybdenum oxide-alumina catalyst (Japanese patent publication No. 5,746/1957) and a chromium oxide-silica alumina catalyst (Japanese patent publication No. 987/1957). Although these catalysts well maintain their activities, they are low in catalyst activity as compared with those employed in the low pressure process and are insoluble, and therefore, the removal of the catalysts is not easy. Accordingly, in all the existing methods, special considerations have been paid to apparatus or steps. Such a matter is considered to be not always easy and economical.

Japanese patent publication No. 7,133/1963 discloses a method for polymerizing olefins using as catalyst a mixed system comprising vanadyl orthophosphate and a hydride or organometallic compound of a metal of Groups I to III of the Periodic Table. In said method, however, the catalytic activity is low and, in the polymerization of ethylene, for example, the amount of polymer obtained for 3 hours is not more than 10 times the amount of vanadyl orthophosphate used, as is clear from Examples 1 and 2 of the specification of said Japanese patent.

The present inventors previously proposed a catalyst for the polymerization of ethylene composed of (1) a substance obtained by reacting a vanadium compound with phosphoric acid and then treating the resultant reaction product with an alcohol, and (2) an organoaluminum compound (cf. Italian Pat. No. 813,938). However, a long period of time was required for the production of this catalyst and the reproducibility of the polymerization activity of the catalyst was lowered by indefinite structure of the catalyst.

As a result of repeated studies made in order to overcome such drawbacks in the conventional processes, the present inventors have been successful in developing novel catalysts characterized by high activity, long life and stability to obtain the process of the present invention.

This invention relates to a process for producing solid high polymers of ethylene by polymerizing ethylene either alone or together with other unsaturated hydrocarbons, and particularly to catalysts having excellent efficiencies for use in said process.

An object of the present invention is to provide a method for producing polyethylene which has overcome the drawbacks of the conventional processes. This object has come to be achieved by the discovery of catalysts which are not only usable under low reaction pressures but have higher activities than those of the low pressure process catalysts and further have a longer life and a higher stability than those of the medium pressure process catalysts.

Another object of the present invention is to provide an easy and commercially practicable process which not only achieves the above-mentioned object but gives a polymer having an average molecular weight of a wide range.

The process of the present invention is characterized in that ethylene, either alone or together with other unsaturated hydrocarbons, is contacted in the presence or absence of hydrogen with a catalyst composed of (1) a reaction product obtained by reacting an orthovanadate compound represented by the formula, $$VO(OR^1)_3$$

wherein $R^1$ is a hydrocarbon group, with a phosphoric acid or an ester of phosphoric acid represented by the formula, $$(R^2O)_mP(O)(OH)_{3-m}$$

wherein R² is a hydrocarbon group and m is 1 or 2, or with a mixture of a phosphoric acid and the ester, and (2) a substance having the formula, $$R_nAlX_{3-n}$$

wherein R is a hydrocarbon group having from 1 to 8 carbon carbon atoms; X is a group selected from halogen, alkoxy groups and hydrogen; and n is a positive number not more than 3, including the case where the said latter substance is a mixture of an organo-aluminum compound and an aluminum halide.

The catalyst employed in the present invention is composed of the above-mentioned two components. For convenience, the vanadium-containing component will be referred to as the first component, and the organo-aluminum compound-containing component as the second component, and the two components will be explained in detail hereinbelow.

The orthovanadates used in the present invention include trimethyl orthovanadate, triethyl orthovanadate, triisopropyl orthovanadate, trinormalpropyl orthovanadate, triisobutyl orthovanadate, trinormalamyl orthovanadate, trinormalhexyl orthovanadate, and trinormaloctyl orthovanadate. Further, a mixture of these orthovanadates can be used, and furthermore, orthovanadates containing a different hydrocarbon group can be used.

The phosphoric acids used in the present invention include orthophosphoric acid, pyrophosphoric acid, metaphosphoric acid, polyphosphoric acid, and phosphoric anhydride.

The phosphoric acid esters used in the present invention include monomethyl phosphate, dimethyl phosphate, monoethyl phosphate, diethyl phosphate, mononormalpropyl phosphate, mononormalbutyl phosphate, dinormalbutyl phosphate, diisobutyl phosphate, monoisoamyl phosphate, mononormalamyl phosphate, dinormalamyl phosphate, dihexyl phosphate, dinormaloctyl phosphate, dilauryl phosphate, monostearyl phosphate, and monophenyl phosphate. Further, a mixture of phosphoric acid and phosphoric acid ester can be used. Furthermore, a mixture of said phosphoric acid esters can be used.

In the reaction of a vanadium alkoxide with a phosphoric acid or a phosphoric acid ester, the phosphoric acid or phosphoric acid ester is used in a proportion of 0.1 to 10 moles per mole of the vanadium alkoxide.

The reaction of a vanadium alkoxide with a phosphoric acid or a phosphoric acid ester can be carried out in the absence of a solvent, but it is preferable, in view of the necessary agitation or removal of the heat of reaction, to use a solvent. Hydrocarbons or alcohols are preferable solvents. For example, the solvents used in the present invention include hexane, heptane, cyclohexane, benzene, toluene, xylene, ethanol, butanol, amyl alcohol, and octyl alcohol.

The reaction of an orthovanadate with a phosphoric acid or a phosphoric acid ester can be carried out at a temperature of from −80° C. to 150° C., and is preferably carried out at a temperature of from 20° C. to 130° C.

The thus obtained reaction product can be used as the first component of the catalyst as it is, without being separated from the solvent, or can be used as the first component of the catalyst after the solvent has been removed by evaporation to dryness or by the other means.

As the second component, there may be used an organo-aluminum compound having at least one carbon-aluminum bond or a mixture of said organo-aluminum compound and an aluminum halide.

Examples of the organo-aluminum compounds include trialkylaluminums, triarylaluminums, dialkylaluminum halides, dialkylaluminum hydrides, dialkylaluminum alkoxides, diarylaluminum halides, alkylaluminum sesquihalides, alkylaluminum dihalides and arylaluminum dihalides. Typical examples of these compounds are trimethylaluminum, triethylaluminum, triisobutylaluminum, trihexylaluminum, trioctylaluminum, diethylaluminum chloride, diisobutyluminus chloride, diisobutylaluminum bromide, diethylaluminum iodide, diphenylaluminum chloride, ethylaluminum sesquichloride, ethylaluminum dichloride, isobutylaluminum dichloride, diethylaluminum hydride, diisobutylaluminum hydride and diethylaluminum ethoxide.

In place of using these organo-aluminums in pure from as the second components, raw materials therefore may be added to the reaction systems so that the second compoents are formed in the systems.

It is also possible to use mixtures of organo-aluminum compounds and aluminum halides, e.g. mixtures of trialkylaluminums and aluminum halides as the second component. It is, of course, possible to use mixtures of various organo-aluminum halides and aluminum halides or trialkylaluminums. Examples of the aluminum halides include aluminum fluoride, aluminum chloride, aluminum bromide and aluminum iodide.

The polymerization reaction may be effected in the absence of solvent, but is preferably carried out in the presence. As the solvents, there are frequently used aliphatic, alicyclic and aromatic hydrocarbons and halogenated hydrocarbons such as, for example, pentane, hexane, heptane, octane, cyclohexane, methylcyclohexane, benzene, toluene, xylene, ethylbenzene, mono or dichlorobenzene and tetrachloroethylene.

These solvents may be used either singly or in admixture of two or more. It is desirable that by a suitable physical or chemical treatment, the solvents have previously been freed to less than permissible amount from polar impurities which might inactivate the catalysts.

The amount of each catalyst component employed is decided depending on polymerization conditions, such as the amount of solvent used, reaction temperature and reaction pressure. Preferably, however, the amount of the first component is 0.001–10 parts by weight per 1000 parts by weight of solvent and the amount of the second component is about 0.01–100 parts by weight per 1000 parts by weight of solvent.

The polymerization reaction conditions are selected in consideration of catalyst concentration, shape of reactor and type of reaction. The reaction temperature is ordinarily from −50° C. to 150° C., preferably from 30° C. to 100° C. The ethylene partial pressure is from 1 kg./cm.² to 300 kg./cm.², preferably from 1 kg./cm.² to 50 kg./cm.². In this case, an inert gas may be present. In case a temperature of from 0° C. to 100° C. is adopted, it is preferable that the first component is suspended in a solvent. In this case, the polymerization product deposits, as the reaction proceeds, to form a slurry. At a temperature of from 120° C. to 300° C., the polymerization product dissolves in the reaction mixture, and therefore the reaction proceeds in the manner of solution polymerization. In this case, the first component may either be suspended or be supported on a carrier to effect the reaction according to the fixed bed type. The polymerization reaction can be carried out in both batch manner and continuous manner.

According to the present invention, not only homopolymerization of ethylene but also copolymerization of ethylene with other olefins or diolefins can readily be carried out. Monomers to be copolymerized with ethylene include olefins such as propylene, butene-1 and hexene-1, and diolefins such as butadiene, isoprene, hexadiene, cyclooctadiene, and dicyclopentadiene. The copolymerization must be controlled so that not more than 10% by mole of the olefins or diolefines may be contained in the copolymer. By such copolymerization, various crystalline ethylene copolymers having an excellent processability and different physical and chemical properties can be obtained.

The mean molecular weight of the polymer to be formed can be controlled by the presence of hydrogen in the polymerization reaction.

The polymerization product may be dried after the solvent has been removed therefrom as it is, but, if desired, the polymer is purified by adding an alcohol such as methanol, propanol or butanol to the polymerization product to solubilize and remove the catalyst residue, and then dried.

The first component of the catalyst system used in the present invention and the catalyst system obtained therefrom have the following characteristics.

(1) The first component of the present invention is simply synthesized in a reaction of an orthovanadate having a definite chemical formula with a phosphoric acid or a phosphoric acid ester, as compared with the first component obtained by an alcohol treatment of a vanadium compound-phosphoric acid reaction product, and thus the structure of the first component of the formed catalyst is definite, and the reproducibility of the catalyst activity is better.

(2) The first component of the catalyst system of the present invention is any combination of orthovanadate with phosphoric acid or phosphoric acid ester, and hence the first component capable of providing a characteristic high performance catalyst can be synthesized according to the desired object.

(3) The catalyst system of the present invention has a considerably high activity, as compared with a catalyst system of orthovanadate-organic aluminum compound, which is the conventional Ziegler catalyst. (See Example 2.)

(4) In the catalyst system of the present invention, the polymerization activity can be maintained for a prolonged period of time, and the amount of polymer formed per total catalyst is large. Further, the amount of catalyst component contained in the obtained polymer, particularly the amount of transition metal component, is very small, and the coloring of the polymer due to the residual catalyst component is greatly reduced.

(5) The first component of the catalyst system of the present invention takes a liquid or solid state, depending upon the selection of $R^1$, $R^2$ and $m$, and the catalyst can serve in the most favourable state, that is, the liquid state, solid state, solution state or suspension state where the powdery catalyst is suspended in a solvent, if necessary.

(6) The catalyst system of the present invention can form the polymers in a good slurry state, as compared with the catalyst system of orthovanadate-organic aluminum compound, and can produce the polymers in a high yield per a definite amount of solvent. The polymerization reaction of ethylene can commercially advantageously be carried out with the catalyst system of the present invention.

All these characteristics are indispensable conditions for commercialization.

The present invention will be hereunder explained, referring to examples. However, these examples are mere embodiments of the present invention, and the present invention is not limited to the following examples.

EXAMPLE 1

11.2 g. of trinormalamyl orthovanadate and 2.62 g. of monobutyl phosphate were mixed in 200 ml. of benzene, and subjected to reaction for 4 hours by elevating the temperature to 80° C. After the benzene was distilled off, the residue was dried at 120° C. for 5 hours, whereby 8.10 g. of a brownish black powdery reaction product was obtained. The thus obtained reaction product was used as the first component of catalyst.

An electromagnetic stirring-type autoclave having a 1-l. capacity was subjected to vacuum and nitrogen flushing, and then 500 ml. of normal heptane was charged into the autoclave. Then, 30 mg. of the first component of catalyst and 0.62 g. of ethyl-aluminum sesquichloride were charged thereinto, and ethylene was introduced thereinto under a pressure of up to 5 kg./cm.². The reaction was conducted at 70° C. for 2 hours, whereby 28 g. of a white powdery polyethylene was obtained. The intrinsic viscosity of the thus obtained polymer was 15.5 (dl./g.), when measured in xylene solvent at 120° C. by an Ostwald's viscometer.

EXAMPLE 2

Polymerization was conducted in a manner similar to that of Example 1 using the same catalyst system as in Example 1 under the initial charging conditions of an ethylene pressure of 12 kg./cm.² and a hydrogen pressure of 9 kg./cm.², whereby 87.3 g. of a polyethylene was obtained. The intrinsic viscosity of the thus obtained polymer was 1.0 (dl./g.).

For comparison, polymerization was conducted in the same manner as above, except that 30 mg. of trinormal-amyl orthovanadate and 0.62 g. of ethylaluminum sesquichloride were used as a catalyst system, whereby 13.0 g. of a polyethylene was obtained.

EXAMPLE 3

8.6 g. of trinormalbutyl orthovanadate and 1.5 g. of phosphoric acid were subjected to reaction in 200 ml. of toluene at 110° C. for 4 hours. After the toluene was distilled off, the residue was dried at 100° C. for 4 hours, whereby 5.5 g. of a reaction product was obtained.

Polymerization was conducted in a manner similar to that of Example 1 using 30 mg. of said reaction product and 0.64 g. of ethylaluminum dichloride under the initial charging conditions of an ethylene pressure of 12 kg./cm.² and a hydrogen pressure of 9 kg./cm.², whereby 38 g. of a polyethylene was obtained. The intrinsic viscosity of the thus obtained polymer was 2.3 (dl./g.).

EXAMPLE 4

5.4 g. of triethyl orthovanadate and 5.5 g. of dibutyl phosphate were mixed in 200 ml of benzene, and subjected to reaction for 4 hours, keeping the temperature at 80° C. After the benzene was distilled off, the residue was dried at 100° C. for 4 hours, whereby 7.7 g. of a reaction product was obtained.

Polymerization was conducted in a manner similar to that of Example 1 using 30 mg. of said reaction product and 0.57 g. of triethylaluminum under the intial charging conditions of an ethylene pressure of 12 kg./cm.² and a hydrogen pressure of 9 kg./cm.², whereby 8.3 g. of a polyethylene was obtained. The intrinsic viscosity of the polymer was 2.8 (dl./g.).

EXAMPLE 5

9.1 g. of trinormaloctyl orthovanadate and 4.8 g. of dinormaloctyl orthophosphate were mixed in 200 ml. of benzene, and subjected to reaction at 80° C. for 4 hours. After the benzene was distilled off, the residue was dried at 100° C. for 4 hours, whereby 10.3 g. of reaction product was obtained.

Polymerization was conducted in a manner similar to that of Example 1 using 30 mg. of said reaction product and 0.61 g. of diethylaluminum monochloride under the initial charging conditions of an ethylene pressure of 12 kg./cm.² and a hydrogen pressure of 9 kg/cm.², whereby 13 g. of a polyethylene was obtained. The intrinsic viscosity of the polymer was 2.8 (dl./g.).

EXAMPLE 6

6.6 g. of triisoamyl orthovanadate and 1.2 g. of monoethyl phosphate were subjected to reaction at 80° C. in a solvent mixture of 150 ml. of isoamyl alcohol and 50 ml. of benzene for 4 hours. After the benzene and the isoamyl alcohol were distilled off, the residue was dried at 125° C. for 4 hours, whereby 4.9 g. of a reaction product was obtained.

Polymerization was conducted in a manner similar to that of Example 1 using 30 mg. of said reaction product and 0.62 g. of ethylaluminum sesquichloride under the initial charging conditions of an ethylene pressure of 12 kg./cm.² and a hydrogen pressure of 9 kg./cm.², whereby 83 g. of a polyethylene was obtained. The intrinsic viscosity of the polymer was 1.0 (dl./g.).

EXAMPLE 7

Copolymerization was conducted in a manner similar to that of Example 1 using the same catalyst system as in Example 1 under the initial charging conditions of an ethylene pressure of 15 kg./cm.$^2$, a hydrogen pressure of 6 kg./cm.$^2$ and a propylene initial charging amount of 10 g., whereby 45.1 g. of a powdery copolymer was obtained. The intrinsic viscosity of the copolymer was 1.7 (dl./g.). The number of methyl groups was 9.2 per 1000 carbon atoms in the polymer when determined from the absorbance at a wave length of 1378 (cm.$^{-1}$) according to the infra-red absorption spectrum method.

What is claimed is:

1. A process for producing a crystalline homopolymer or copolymer of ethylene having an ethylene content of at least 90 mole percent, characterized in that ethylene, either alone or together with other unsaturated hydrocarbon, is contacted in the presence or absence of hydrogen with a catalyst composed of (1) a substance obtained by a method consisting essentially of reacting an orthovanadate compound represented by the formula, $$VO(OR^1)_3$$

wherein R$^1$ is a hydrocarbon group, with a phosphoric acid or a phosphoric acid ester represented by the formula, $$(R^2O)_mP(O)(OH)_{3-m}$$

wherein R$^2$ is a hydrocarbon group and $m$ is 1 or 2, at a temperature of from −80° to 150° C., and (2) a substance having the formula, $$R_nAlX_{3-n}$$

wherein R is a hydrocarbon group having from 1 to 8 carbon atoms; X is a group selected from the group consisting of halogen, alkoxy groups and hydrogen; and $n$ is a positive number not more than 3, including the case where said substance is a mixture of an organo-aluminum compound and an aluminum halide.

2. A process according to claim 1, wherein the said unsaturated hydrocarbon is at least one member selected from the group consisting of olefins and diolefins.

3. A process according to claim 4, wherein the said substance (1) is synthesized at one step by reacting the orthovanadate compound with the phosphoric acid or the phosphoric acid ester without isolation.

4. A catalyst for ethylene homopolymerization and copolymerization composed of (1) a substance obtained by reaction of an orthovanadate compound represented by the formula.

$$VO(OR^1)_3$$

wherein R$^1$ is a hydrocarbon group, with a phosphoric acid or a phosphoric acid ester represented by the formula, $$(R^2O)_mP(O)(OH)_{3-m}$$

wherein R$^2$ is a hydrocarbon group and $m$ is 1 or 2, and (2) a substance having the formula, $$R_nAlX_{3-n}$$

wherein R is a hydrocarbon group having from 1 to 8 carbon atoms; X is a group selected from the group consisting of halogen, alkoxy groups and hydrogen; and $n$ is a positive number not more than 3, including the case where said substance is a mixture of an organo-aluminum compound and an aluminum halide.

References Cited

UNITED STATES PATENTS 3,519,613   7/1970   Nakaguchi et al. ----- 260—94.9

JOSEPH L. SCHOFER, Primary Examiner

R. A. GAITHER, Assistant Examiner

U.S. Cl. X.R.

260—88.2 E, 94.9 C